United States Patent [19]
Lundgren

[11] 3,866,282
[45] Feb. 18, 1975

[54] CUTTING INSERT

[75] Inventor: Evert Gustav Lundgren, Sandviken, Sweden

[73] Assignee: Sandvik Aktiebolag, Sandviken, Sweden

[22] Filed: Apr. 13, 1973

[21] Appl. No.: 351,012

[30] Foreign Application Priority Data
May 17, 1972 Sweden.............................. 6419/72

[52] U.S. Cl. .................................................. 29/95
[51] Int. Cl............................................. B26d 1/00
[58] Field of Search................................... 29/95, 96

[56] References Cited
UNITED STATES PATENTS
3,383,748   5/1968   Galimberti et al...................... 29/95
3,395,434   8/1968   Wirfelt................................... 29/95

Primary Examiner—Harrison L. Hinson
Attorney, Agent, or Firm—Pierce, Scheffler & Parker

[57] ABSTRACT

An indexible cutting insert is given applicability to perform under varying working conditions by giving the corner part a smaller rake angle $\gamma$ than the remaining parts of the cutting edge, the rake angle continuously decreasing in the direction of the corner in a transition zone which may extend up to one-third of the total length of the appertaining edge.

1 Claim, 9 Drawing Figures

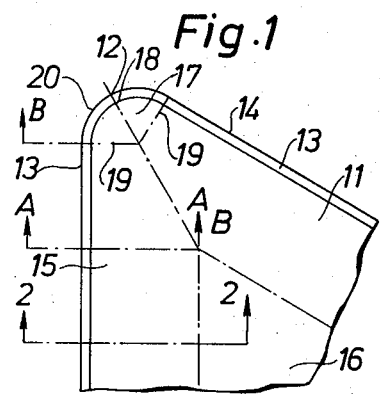
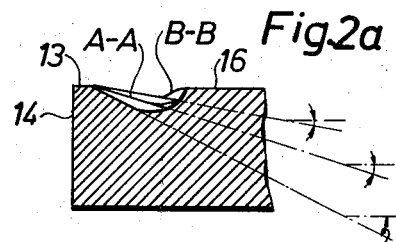
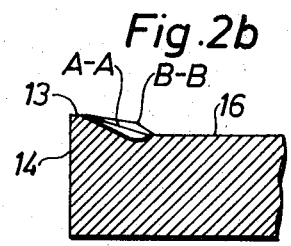
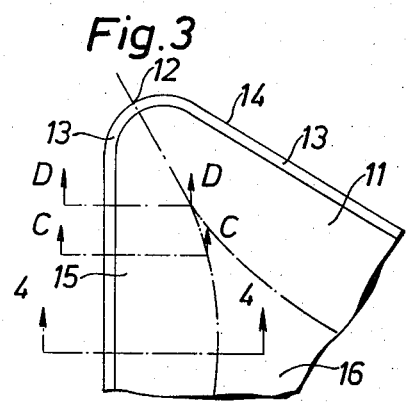
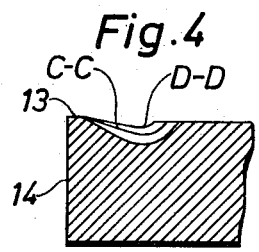
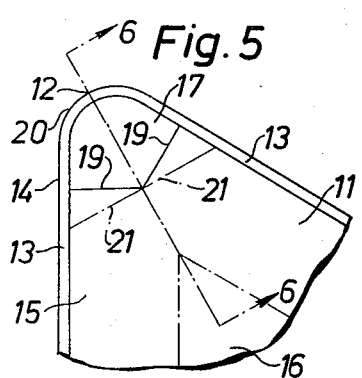
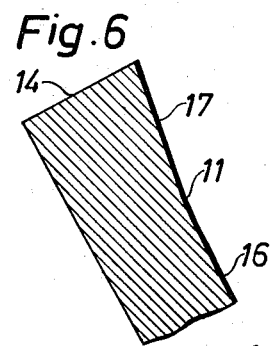
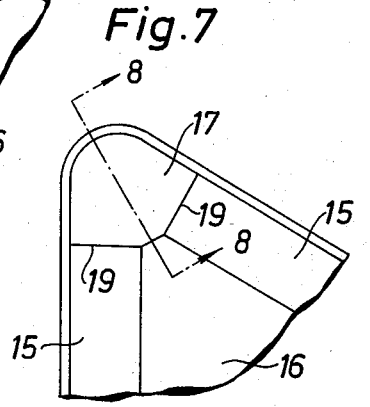
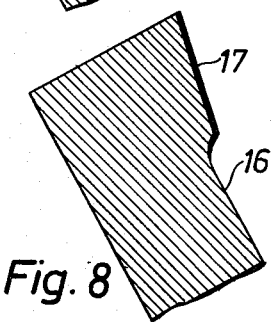

CUTTING INSERT

The present invention relates to inserts for chip-forming machining of metal work pieces and, in particular, to triangular square, rhombic, rhomboidal or other forms of indexible or "throw-away" inserts having at least one cutting edge.

It heretofore had been proposed to provide such inserts with chip breakers on the major sides or rake faces of the inserts, said chip breakers extending along the cutting edges. These chip breakers may be formed in one or several steps. In order to fulfil the demands upon satisfactory chip breaking by an insert under most varying working conditions, i.e. varying feed and cutting depth, - several different solutions have been proposed. Here may be mentioned for instance the known insert type provided with an extra chip breaker at the insert corner or nose radius, - i.e., the so-called "triple" or "miniature" chip breaker, - applied in the shape of a cacity and meant for finishing. Other known embodiments of this principle include the chip breaker groove, along-side the cutting edge, has a varying depth and/or width, with a view of adapting the chip breaking to the thickness and width of the chip.

According to the present invention there is provided a cutting insert which gives improved chip breaking and chip removal as compared to earlier known inserts, and which has shown superior properties under the most varying cutting conditions. As will be shown in the following description, the design of the chip breaker is adapted to give optimum properties and conditions in consideration of several essential factors, including also the cutting forces.

The cutting insert according to the invention is characterized in that the corner part or area is formed with a smaller rake angle $\gamma$ than the reamining parts of the cutting edge. It is also essential that the mentioned rake angle $\gamma$ decreases continuously in the direction towards the insert corner within a considerable transition zone, which can be at the most ⅓ of the total length of the side or edge of the insert. The invention will be further described in the following description taken with the appended drawings, wherein:

FIG. 1 is a plan view of a corner part of cutting insert according to the invention;

FIG. 2a and FIG. 2b show profile of chip breaker as sectioned and indicated at 2—2 in FIG. 1, and also show form and inclination of the rake face as sectioned and indicated at A-A and B-B in FIG. 1;

FIG. 3 is another embodiment of corner part of cutting insert according to the invention;

FIG. 4 shows profile of chip breaker as sectioned and indicated at 4—4 in FIG. 3, and also shows form and inclination of the rake face as sectioned and indicated at C—C and D—D in FIG. 3;

FIG. 5 represents a further embodiment of a corner part of a cutting insert according to the invention;

FIG. 6 shows profile of corner part of the insert in FIG. 5 as sectioned along the bisector;

FIG. 7 shows a further embodiment of a corner part of a cutting insert according to the invention; and FIG. 8 shows profile of the corner part of the insert in FIG. 7 as sectioned along the bisector.

The insert 10 shown in FIGS. 1–8 has at one major face 11 (and possibly also at the opposite face) at least one corner 12 with one or more connecting cutting edges 13, formed at the intersection between the mentioned major face and the end faces 14 of the insert. Along the cutting edges there are chip breakers 15 in the form of grooves surrounding a central part 16 of the insert.

In the embodiments shown in FIGS. 1 and 2 the rake angle $\gamma$ (compare FIG. 2a) decreases continuously from the main cutting edge (see the section 2—2) towards the corner part 17 of the rake face (illustrated by the section A—A and B—B). The central part 16 may, in a way known per se, lie at about the same level as the cutting edge (FIG. 2a), or, it may be at an essentially lower level (FIG. 2 b). The inclination of the rake face may decrease continuously towards the corner of the insert all the way out to the point 18 where the corner radii of the two connecting cutting edges meet. Often, the continuously decreasing rake or inclination ends at a boundary line 19, perpendicular to the cutting edge, said line being situated between the nose radius 20 and the remaining part of the cutting edge, i.e. where the main edge is transformed into the nose radius part. The rake face of the circle sector, which is defined by the nose radius 20 and the mentioned boundary lines 19, has essentially constant form and rake.

FIGS. 3 and 4 show an embodiment in which the width of the chip breaker decreases continuously toward the cutting edge.

FIGS. 5 and 6 show another emobidment in which the very corner part has essentially constant rake and form. In this case, the corner part has a greater extension than in the embodiment according to FIG. 1, and the continuously decreasing inclination ends at a certain distance from the nose radius. The end or the transition may be a boundary line 19 perpendicular to the cutting edge (as in earlier shown embodiments), or it may be a boundary line 21 perpendicular to the bisector.

According to the embodiment shown in FIGS. 7 and 8 the corner face 17 extends to the central part 16 of the insert, which part in this case is below the cutting edge. Within the scope of essentially constant form and rake, the corner part 17 may, besides having plane configuration, be concave and/or convex.

The influence of the described forms of cutting inserts upon the cutting course or operation may be explained in the following way:

At small cutting depths and feeds, the chip has to be bent very much in order to break because of its small cross section. If, now, a chip breaker is dimensioned for these small chip thicknesses and cutting depths it will, on the other hand, give too hard or great chip breaking at larger chip thickness and cutting depth. In the earlier mentioned known embodiments of cutting inserts it has been attempted to solve the problem by varying the depth and width of the chip breaker groove. The deformation or initial bend which the chip receives in the course of separation depends not merely upon the chip thickness but also upon the size of the rake angle. A decreasing rake angle means increasing initial bend. In the cutting insert according to the invention a continuously increasing initial bend in the direction towards the corner of the cutting insert is thus obtained, which makes the chip more self-breaking in those cases where stronger breaking is necessary.

A decrease of the rake angle gives increasing cutting forces. In the insert according to the invention increasing rake angle is obtained at increasing cutting depth. This means that large cutting depths cause relatively limited cutting forces, which is often of great importance. At small cutting depth, on the other hand, the cutting force problem is not as critical, but it is more essential to decrease the rake angle in order to break the chip satisfactorily. At the corner of the insert it can often be important to have particularly great chip breaking capability. By varying the extension of the corner part and the extension of the transition area between the corner and the remaining part of the cutting edge, it is possible to vary the "severity" or effect of the chip breaking.

The chip breaker can connect directly with the cutting edge, which latter may be sharp or slightly rounded. It can also connect to the cutting edge via a plane face or land area, which area may be parallel with the top or bottom face of the insert or may incline in negative or positive angle towards them.

As had been mentioned earlier, the back edge of the chip breaker connects with a central part of the insert.

In negative cutting inserts having cutting edges upon both major faces of the insert, the central parts of the faces are mainly plain or parallel. In single-faced inserts, positive or negative, having cutting edges only upon the top major face, the central part may have another shape. Generally, the inserts may have straight, as well as curved, cutting edges.

I claim:

1. Cutting insert for chip-forming machining of metal work pieces, said insert having at least one cutting edge (13) formed of the transition between the major faces (11) and end faces (14) and a chip breaker groove (15) extending along the cutting edge (13) on the major or rake face (11), the mentioned end faces being connected by insert corners (12) provided with nose radius (20), in which cutting insert the cutter side of the chip breaker groove, seen in transverse cross-section, has an essentially straight profile, and in which the corner part (17) of the rake face is formed with a smaller rake angle $\gamma$ than the remaining parts of the cutting edge (13), said rake angle $\gamma$ decreasing continuously in the direction towards the insert corner (12) within a considerable transition zone which is at the most one-third of the total length of the side or edge of the cutting insert.

* * * * *